(12) United States Patent
Londergan et al.

(10) Patent No.: US 9,365,330 B2
(45) Date of Patent: Jun. 14, 2016

(54) GECKO-LIKE CONTAINER CAPPING SYSTEM AND METHODS

(71) Applicant: EMPIRE TECHNOLOGY DEVELOPMENT LLC, Wilmington, DE (US)

(72) Inventors: Timothy Londergan, Seattle, WA (US); Feng Wan, Issaquah, WA (US); Kenichi Hashizume, Tokyo (JP); Scott Needham, Mangerton (AU)

(73) Assignee: Empire Technology Development LLC, Wilmington, DE (US)

( * ) Notice: Subject to any disclaimer, the term of this patent is extended or adjusted under 35 U.S.C. 154(b) by 107 days.

(21) Appl. No.: 13/819,776

(22) PCT Filed: Oct. 5, 2012

(86) PCT No.: PCT/US2012/059002
§ 371 (c)(1),
(2) Date: Feb. 28, 2013

(87) PCT Pub. No.: WO2014/055086
PCT Pub. Date: Apr. 10, 2014

(65) Prior Publication Data
US 2014/0097193 A1    Apr. 10, 2014

(51) Int. Cl.
*B65D 43/26* (2006.01)
*B65D 41/02* (2006.01)

(52) U.S. Cl.
CPC ........... *B65D 41/02* (2013.01); *Y10T 29/49826* (2015.01)

(58) Field of Classification Search
CPC ...... B65D 41/22; B65D 41/225; B65D 41/02; Y10T 29/49826
USPC ................... 215/43, 316, 232, 319, 320, 321; 220/796, 359.1, 359.2, 287, 805, 285
See application file for complete search history.

(56) References Cited

U.S. PATENT DOCUMENTS

| 1,163,805 | A  | * | 12/1915 | Bonn et al. | 215/319 |
|---|---|---|---|---|---|
| 2,172,544 | A  | * | 9/1939 | Panter | 215/317 |
| 2,733,827 | A  | * | 2/1956 | Foye | 215/345 |
| 3,069,040 | A  | * | 12/1962 | Corsette | 215/318 |
| 3,963,140 | A  |   | 6/1976 | Harding |  |
| 7,056,409 | B2 | * | 6/2006 | Dubrow | 156/276 |

(Continued)

OTHER PUBLICATIONS

International Search Report and Written Opinion for PCT/US2012/059002 dated Jan. 22, 2013.

(Continued)

*Primary Examiner* — Fenn Mathew
*Assistant Examiner* — James N Smalley
(74) *Attorney, Agent, or Firm* — Pepper Hamilton LLP

(57) ABSTRACT

Methods, systems, caps, containers, and assemblies for a gecko-like container capping system are described. A gecko-like cap configured to cover an opening in a container may include an inner surface configured to mate with an opening surface of a container. Setae may be located on a surface of the cap and/or a surface of the container that are configured to oppose movement of the cap away from the container by creating an adhesion force between the inner surface and the opening surface. The cap may include one or more release mechanisms configured to deflect the inner surface away from the opening surface, thereby reducing the adhesion force such that the cap is removable from the container.

13 Claims, 6 Drawing Sheets

(56) References Cited

U.S. PATENT DOCUMENTS

| | | | |
|---|---|---|---|
| 7,097,058 B2 | 8/2006 | Wellman et al. | |
| 7,581,653 B2 | 9/2009 | Perrin et al. | |
| 7,811,272 B2 | 10/2010 | Lindsay et al. | |
| 8,261,416 B2 | 9/2012 | Rothbaum et al. | |
| 2005/0271869 A1 | 12/2005 | Jackson | |
| 2006/0005362 A1* | 1/2006 | Arzt et al. | 24/442 |
| 2006/0021991 A1* | 2/2006 | Liu | 220/793 |
| 2006/0029697 A1 | 2/2006 | Robbins et al. | |
| 2007/0285870 A1 | 12/2007 | Shim | |
| 2008/0025822 A1 | 1/2008 | Kim et al. | |
| 2009/0212060 A1* | 8/2009 | Shinohara et al. | 220/661 |
| 2010/0319111 A1 | 12/2010 | Berns | |

OTHER PUBLICATIONS

Autumn, Properties, Principles, and Parameters of the Gecko Adhesive System, *Biological Adhesives* (2006), pp. 1-39.

Berengueres et al., Gecko inspired Electrostatic Chuck, *Proceedings of the 2006 IEEE International Conference on Robotics and Biomimetics, Kunming, China* (Dec. 17-20, 2006), pp. 1018-1023.

Black, Gecko inspires sticky tape, BBC News (Jun. 1, 2003), http://news.bbc.co.uk/2/hi/science/nature/2953852.stm.

Ma et al., Surface engineering of electrospun polyethylene terephthalate (PET) nanofibers towards development of a new material for blood vessel engineering, *Biomaterials* May 2005), 26(15):2527-2536 (Abstract).

Mekaru, Effect of Applying Ultrasonic Vibration in Hot Embossing and Nanoimprint, *National Institute of Advanced Industrial Science and Technology, Japan* (Printed from Internet May 25, 2012).

Qu et al., Gecko-Foot-Mimetic Aligned Single-Walled Carbon Nanotube Dry Adhesives with Unique Electrical and Thermal Properties, *Advanced Materials* (2007), 19:3844-3849.

Suction Cup Tape, http://www.inventables.com/technologies/suction-cup-tape (Printed from Internet May 25, 2012).

Total Petrochemicals, http://www.totalpetrochemicals.com/SiteCollectionDocuments/Brochures/Products/HDPE-ISBM.pdf, (Nov. 2010).

Fearing, Smart Gecko Tape, http://www.scientificamerican.com/article.cfm?id=how-do-gecko-lizards-unst (Printed from Internet Feb. 12, 2013).

Autumn, How do gecko lizards unstick themselves as they move across a surface?, http://robotics.eecs.berkeley.edu/~ronf/Gecko/interface08.html (Sep. 29, 2003).

* cited by examiner

GECKO-LIKE CONTAINER CAPPING SYSTEM AND METHODS

CLAIM OF PRIORITY

This application is a U.S. national stage filing under 35 U.S.C. §371 of International Application No. PCT/US2012/059002 filed Oct. 5, 2012 entitled "Gecko-Like Container Capping System and Methods," the disclosure of which is incorporated by reference in its entirety.

BACKGROUND

Plastics play a significant role in nearly all aspects of modern life. Consumers repeatedly come into contact with products containing plastic material, ranging from sophisticated medical devices and consumer electronics to more basic products, such as disposable razors. However, plastics also make up a significant percentage of the waste stream generated each year. As a result, much effort has been expended to reclaim and recycle post-consumer plastics, especially food and beverage containers, which represent a large amount of recyclable post-consumer plastic.

In general, food and beverage containers comprise a containing body manufactured from one type of plastic polymer and some form of lid or cap, which is frequently manufactured from a different type of plastic polymer. For example, the ubiquitous water bottle is often made from polyethylene terephthalate (PET) while the bottle caps are often made from polypropylene (PP). When the two materials are mixed together during recycling, one type of material may contaminate the other. This reduces the value of the recycled material and/or requires resources to separate the materials before processing. In many instances, if a plastic container has a cap on it, the entire container is recycled as a unit because consumers are not advised or forget to remove the cap from the container. As such, many plastic-containing products, and food and beverage containers in particular, introduce significant inefficiencies into the post-consumer plastics recycling process.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one embodiment, a cap may be configured to cover an opening in a container. The cap may comprise an inner surface configured to mate with an opening surface of a container. The inner surface may comprise a plurality of setae configured to oppose movement of the cap away from the container by creating an adhesion force between the inner surface and the opening surface. The cap may additionally comprise at least one release mechanism configured to reduce the adhesion force such that the cap is removable from the container.

In one embodiment, a method of manufacturing a cap configured to cover an opening in a container may comprise forming an inner surface on the cap configured to mate with an opening surface of a container. A plurality of setae may be formed on the inner surface. The plurality of setae may be positioned to create an adhesion force between the inner surface and the opening surface, thereby opposing movement of the cap away from the container. The method may further comprise forming at least one release mechanism configured to reduce the adhesion force such that the cap is removable from the container.

In one embodiment, a closeable assembly may comprise a container and a cap. The container may comprise an opening surface positioned about an opening. The cap may comprise an inner surface configured to mate with the opening surface of the container. In an embodiment, a plurality of setae may be arranged on the inner surface. In another embodiment, a plurality of setae may be arranged on the opening surface. In a further embodiment, at least a portion of a plurality of setae may be arranged on the inner surface and at least a portion of a plurality of setae may be arranged on the opening surface. The plurality of setae may be configured to oppose movement of the cap away from the container by creating an adhesion force between the inner surface and the opening surface. The closable assembly may further comprise at least one release mechanism configured to reduce the adhesion force such that the cap is removable from the container.

In one embodiment, a method of manufacturing a closeable assembly may comprise forming a container and a cap configured to mate with the container. Forming the container may comprise forming an opening surface about an opening. Forming the cap may comprise forming an inner surface configured to mate with the opening surface of the container. A plurality of setae may be formed that are configured to create an adhesion force between the inner surface and the opening surface, thereby opposing movement of the cap away from the container. In addition, at least one release mechanism may be formed that is configured to reduce the adhesion force such that the cap is removable from the container.

In one embodiment, a method of sealing a container may comprise providing a container and a cap configured to mate with the container. The container may comprise an opening surface positioned about an opening. The cap may comprise an inner surface configured to mate with the opening surface of the container. A plurality of setae may be arranged on the inner surface and/or on the opening surface. The plurality of setae may be configured to oppose movement of the cap away from the container by creating an adhesion force between the inner surface and the opening surface. The method may additionally comprise providing at least one release mechanism configured to reduce the adhesion force such that the cap is removable from the container. The container may be sealed by joining the container and the cap such that the inner surface is positioned adjacent the opening surface, thereby creating an adhesion force between the inner surface and the opening surface via the plurality of setae, the adhesion force opposing movement of the cap away from the container.

In one embodiment, a container configured to receive a cap for closing an opening of the container may comprise an opening surface configured to mate with an inner surface of the cap. The opening surface may comprise a plurality of setae configured to oppose movement of the cap away from the container by creating an adhesion force between the inner surface and the opening surface. The container may further comprise at least one release mechanism configured to reduce the adhesion force such that the cap is removable from the container.

DETAILED DESCRIPTION

The following terms shall have, for the purposes of this application, the respective meanings set forth below.

"Gecko-like" refers to providing adhesive properties by mimicking certain characteristics of the foot of a gecko, such as the Tokay gecko (*Gekko gecko*). In general, a gecko-like structure may comprise a large number of densely packed nano-scale protrusions. Each individual protrusion may only provide a minute amount of adhesiveness; however, collectively, a mass of protrusions may allow for a strong attachment with a contacting surface. In addition, a gecko-like structure may adhere strongly to a surface while providing for relatively easy removal of the gecko-like structure from the surface, especially compared to traditional adhesives of similar strength. Gecko-like structures may be generated from various materials, such as densely packed polymer nanofibers.

A "seta" refers to a nano-scale protrusion formed on a surface of a gecko-like structure. A plurality of setae may collectively provide the adhesive properties of a gecko-like structure. For example, setae may comprise nano-scale fibrils, such as polymer fibrils extruding from an adhesive surface of a gecko-like structure. Each seta may have a certain length and diameter depending on the substrate material and/or desired adhesive properties. For instance, setae may have a diameter of from about 0.1 nm to about 200 μm and a length of from about 0.1 nm to 300 μm.

The present disclosure is directed to gecko-like container capping systems and methods. In an embodiment, the gecko-like container capping system may comprise, consist essentially of, or consist of a container, a cap configured to mate with the container, and gecko-like structures configured to fasten the cap to the container. In some cases, the cap can be tethered to the container, while in other cases they can be untethered. The gecko-like container capping system may be associated with one or more release mechanisms configured to facilitate releasing the cap from the container. The cap and the container may comprise materials, including, without limitation, polyethylene terephthalate (PET), polypropylene (PP), polyethylene, such as high density polyethylene (HDPE), polyimide, or polydimethylsiloxane. In some embodiments, the cap and the container may comprise one or more different materials. In some embodiments, the cap and the container may contain the same or substantially the same material or materials. This may operate, among other things, to greatly increase the efficiency of recycling a container and cap assembly configured according to some embodiments described herein.

Figure 1:
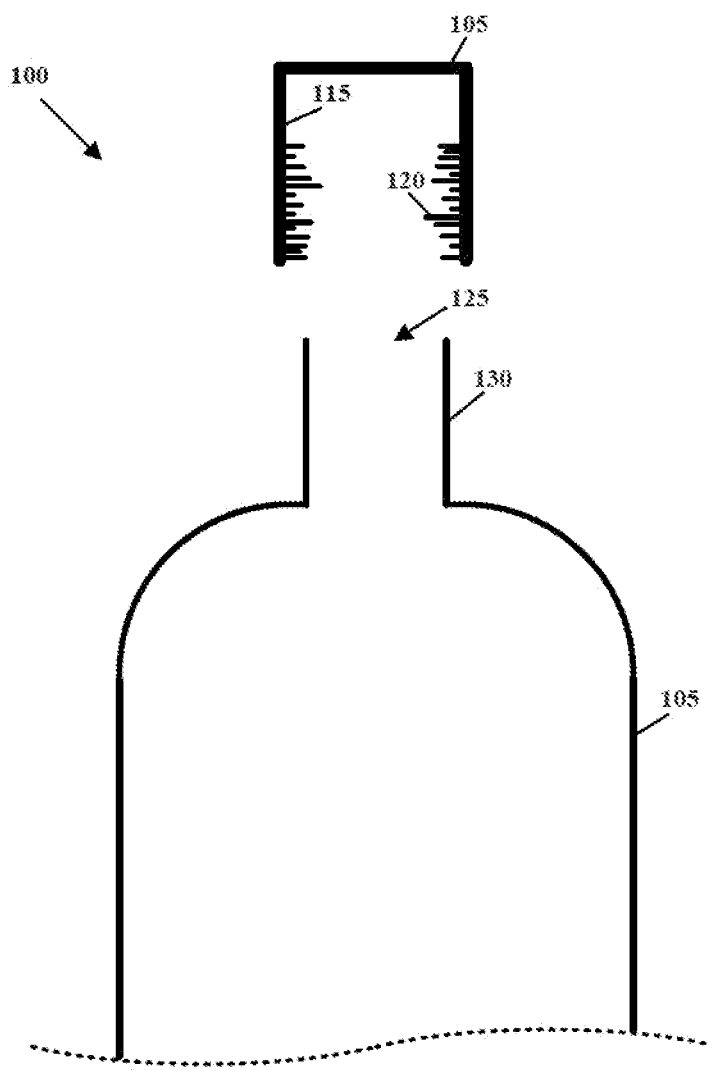
FIG. 1 depicts an illustrative gecko-like container capping system according to some embodiments.

FIG. 1 depicts an illustrative gecko-like container capping system according to some embodiments. As depicted in FIG. 1, the gecko-like container capping system 100 may comprise a container 105 and a corresponding cap 110. In general, a container 105 may comprise a structure capable of holding a material, such as a bottle or jar, having an opening to receive or release the material. In general, a cap 110 may comprise a structure capable of covering the opening of the container 105, and is generally shaped to correspond with the shape and size of the opening of the container.

The cap 110 may comprise an inner surface 115 having setae 120 arranged thereon. The cap 110 may be configured to receive the opening surface 130 of an opening 125 of the container 105. The inner surface 115 of the cap 110 may mate with the opening surface 130 of the container 105 such that the setae 120 contact the opening surface and oppose movement of the cap away from the container, for example, by creating an adhesion force between the inner surface and the opening surface. In an embodiment, the opening surface 130 may be smooth or may comprise one or more patterns, protrusions, and/or setae configured to facilitate adhesion with the setae 120 arranged on the cap 110.

The container 105 may be closed by placing the cap 110 on and around the opening 125 and pressing down on the cap such that the cap covers the opening and the setae 120 make effective contact with the opening surface 130. In an embodiment, effective contact of the setae 120 with the opening surface 130 comprises contact sufficient for the setae to adhere to the opening surface and oppose or prevent movement of the cap 110 away from the container 105. For example, effective contact may result in adhesion between the container 105 and the cap 110 such that human intervention (e.g., pulling the cap away from the container) is required to remove the cap from the container. In another example, effective contact may operate to fasten the cap 110 to the container 105 such that the container is sealed by the cap, including providing a water tight and/or air tight seal.

The container 105 and the cap 110 may comprise various materials. The materials may be petroleum based, polysaccharide-based, protein-based, or a combination thereof. The materials may be biodegradable. Illustrative materials include high density polyethylene (HDPE), low density polyethylene (LDPE), polyethylene terephthalate (PET), polyvinyl chloride (PVC), polypropylene (PP), polystyrene (PS), polyimide, polydimethylsiloxane, poly(lactic acid) (PLA), chitosan, gelatin, epoxy resin, post-consumer resin (PCR), K-resin, and combinations thereof. In an embodiment, the container 105 and the cap 110 comprise the same or substantially the same material or materials. In addition, all or part of the container 105 and/or the cap 110 may be made by conventional injection molding processes.

Although the setae 120 in FIG. 1 are depicted as being formed on the cap 110, and the inner surface 115 in particular, embodiments are not so limited. According to some embodiments, the setae 120 may be formed on the container 105 and/or the cap 110 in various locations. A non-limiting example provides that the setae 120 may be formed on the container, such as on and around the opening surface 130. In another non-limiting example, the setae 120 may be formed on both the container 105 and the cap 110 in either substantially equal or disparate portions. In this example, at least a portion of the setae 120 may be formed on the container 105 and at least a portion of the setae may be formed on the cap 110.

The setae 120 may be formed, for example, from the inner surface 115 of the cap 110 and/or the opening surface 130 of the container 105, through various setae formation processes. Selecting a setae formation process may depend on several factors, including, without limitation, the cap and/or container material(s), preferred adhesiveness properties, cost, manufacturing processes, and combinations thereof. Illustrative and non-restrictive examples of setae formation processes include electrospinning, photo- or electron-beam lithography, nanoimprinting, roll-to-roll printing, nanolithography, nanomachining, ion etching, molecular self-assembly, ultrasonic vibration assisted hot embossing or nanoimprinting, and combinations thereof.

In an embodiment, the container 105 may comprise a polymer (e.g., PET) and the setae 120 may be stamped onto an outer surface of the container, such as the opening surface 130. For example, the setae 120 may be formed using a silicone mold in combination with ultrasonic vibration-assisted nanoimprinting. In this embodiment, the mold may be pressed against the opening surface 130 and subjected to ultrasonic vibrations that generate heat sufficient to cause the mold to press the setae 120 into the compositional material of the opening surface 130. In another embodiment, the setae 120 may be formed by a nanoimprinting process using a stamping mold from inside of the cap 110. For example, a shaped nanoimprinting mold with a smaller diameter than the inner diameter of the cap 110 may be heated above the melting point or deformation temperature of the material or materials used to make the cap. The heated mold may be quickly rolled along the inner wall of the cap 110 with sufficient pressure to generate the setae 120. A further embodiment provides that the setae 120 may be generated on the inner surface 115 of the cap 110 by an in-mold lamination method. In this method, a nano-fiber pattern may be formed on the inner surface 115 by printing on a polymer film, such as a PET film, using electrospinning techniques. The resulting film may be cut into appropriately sized pieces and set on an inner mold of an injection molding system configured to generate the cap 110. When the cap 110 is generated through the injection molding process, the setae 120 may be formed on the inner surface 115.

In an embodiment, the setae 120 may be continuous with the surface from which they are formed. For example, the setae 120 may be continuous with the inner surface 115 in that the setae may comprise a region of the inner surface molded to form protrusions that make up the setae. In another embodiment, the setae 120 may be formed on a separate piece of material and combined with the container 105 and/or the cap 110. For instance, the setae 120 may be formed from a separate piece of material (which may or may not be the same material that makes up the container 105 and/or the cap 110) and may be combined with the container and/or cap when forming the gecko-like container capping system 100. For example, the setae 120 may be molded onto a separate substrate and combined with the container 105 and/or the cap 110 through a molding or adhesive process. In another example, the setae 120 may be formed or roll-to-roll printed on a gecko-like adhesive tape, gel, or other structure that may be combined with the container 105 and/or the cap 110 as part of the gecko-like container capping system 100.

The setae 120 may comprise setae characteristics, including, without limitation, materials, chemical compositions, potential container contents and/or uses, adhesive strength, container and/or cap configurations, release properties, and combinations thereof. For example, the setae 120 characteristics may include, without limitation, length, diameter, density, material, location, and surface area 115. The setae characteristics may be configured to achieve certain effects, such as cap placement, adhesiveness, ease/difficulty of release, container performance characteristics (e.g., exposure to certain temperatures), and combinations thereof.

According to some embodiments, one or more of the setae 120 characteristics may be determined based on a length and/or diameter of the setae. In some embodiments, the setae 120 may have a diameter from about 0.2 μm to about 0.5 μm, from about 0.1 nm to about 10 μm, from about 1 nm to about 1 μm, from about 1 μm to about 1 μm, from about 10 nm to about 20 nm, from about 100 nm to about 500 nm, from about 200 nm to about 1 μm, and from about 50 μm to about 150 μm. Specific illustrative diameters include about 0.1 nm, about 1 nm, about 10 nm, about 100 nm, about 1,000 nm, about 2,000 nm, about 3,000 nm, about 4,000 nm, about 5,000 nm, and ranges between any two of these values. In some embodiments, the setae 120 may have a length from about 0.1 μm to about 500 μm, from about 10 μm to about 250 μm, from about 50 μm to about 150 μm, from about 10 nm to about 50 nm, from about 50 nm to about 100 nm, from 1 μm about 100 μm, from about 5 μm to about 150 μm, from about 30 μm to about 130 μm, from about 50 μm to about 150 μm, and from about 100 μm from about 250 μm. Specific illustrative lengths include about 0.1 μm, about 10 μm, about 50 μm, about 100 μm, about 200 μm, about 300 μm, about 400 μm, about 500 μm, and ranges between any two of these values. In an embodiment, the setae 120 may have a diameter of about 100 nm and a length of about 200 μm.

According to some embodiments, the setae may be hierarchical or single strained, angled or not angled, straight or curly, branched or unbranched, or some combination thereof. In an embodiment, a seta may be a single pillar. In some embodiments, a seta may be further branched out into hundreds of spatula, with length and diameter dimensions of from about 2 μm to about 5 μm long and from about 100 nm to about 200 nm in diameter.

In some embodiments, the setae may have an aspect ratio of from about 1 to about 7, from about 4 to about 10, from about 10 to about 15, from about 15 to about 20. According to some embodiments, the setae may have an aspect ratio of about 6, about 10, about 12, about 13, about 14, about 16, or about 18.

According to some embodiments, the setae may have a density of from about 10,000 per $mm^2$ to about 2 million per $mm^2$. In some embodiments, the setae may have a density of about 50,000 per $mm^2$, about 100,000 per $mm^2$, about 200,000 per $mm^2$, about 400,000 per $mm^2$, about 500,000 per $mm^2$, about 600,000 per $mm^2$, or about 1 million per $mm^2$.

Figure 2A:
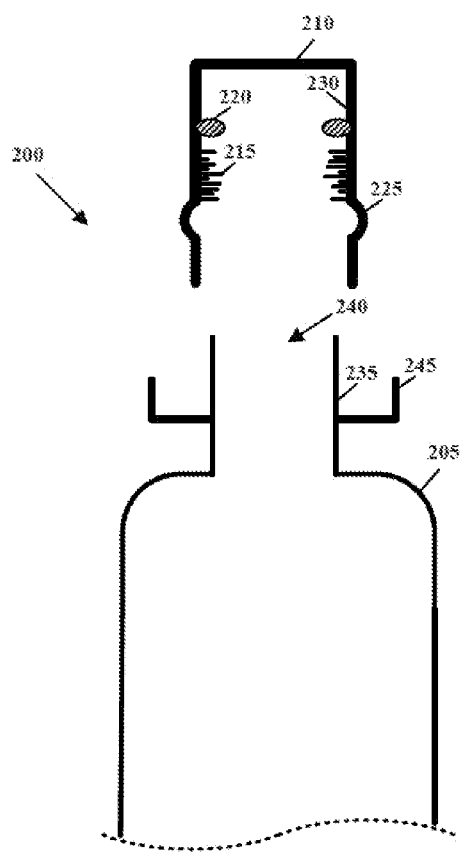
FIG. 2A depicts an illustrative gecko-like container capping system in an open position according to some embodiments.
Figure 2B:
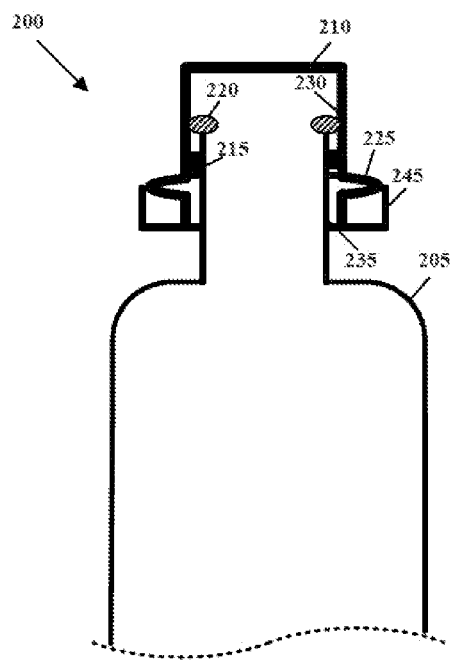
FIG. 2B depicts an illustrative gecko-like container capping system in a closed position according to some embodiments.

FIG. 2A depicts an illustrative gecko-like container capping system in an open position according to some embodiments, while FIG. 2B depicts an illustrative gecko-like container capping system in a closed position according to some embodiments. In some cases, as depicted in FIG. 2A, the gecko-like container capping system 200 may comprise, consist essentially of, or consist of a container 205 and a cap 210. In some cases, the cap 210 can be tethered to the container 205, while in other cases they can be untethered. Setae 215 may be formed on an inner surface 230 of the cap 210.

The cap 210 may comprise a spring mechanism 225 configured, for instance, as a spring-like structure at the lower end of the cap. In an embodiment, the spring mechanism 225 may comprise a monocock structure. The spring mechanism 225 may be engaged when the gecko-like container capping system 200 is in the closed state, as depicted in FIG. 2B and described in more detail below. According to some embodiments, the spring mechanism 225 may be located at an upper end of the cap 210, for example, above the setae 215 and/or the one or more dimple structures 220, or in the middle of the cap. As such, the location of the spring mechanism 225 is not limited, as the spring structure may be located in a suitable location where it may operate according to embodiments described herein.

The container 205 may comprise an opening 240 having an opening surface 235. A stopper mechanism 245 configured to interface with a lower portion of the cap 210 may be located on the opening surface 235.

Referring to FIG. 2B, when the cap 210 is pushed downward, sliding along the opening surface 235 of the container 205, the lower portion of the cap may abut the stopper mechanism 245. In an embodiment, the stopper mechanism 245 and/or the cap 210 may be configured such that the lower portion of the cap fits securely into the stopper mechanism. The stopper mechanism 245 may additionally operate to prohibit the cap 210 from expanding, for example, and releasing pressure or becoming detached from the container 205.

As depicted in FIG. 2B, the cap 210 may be pushed onto the container 205 causing the setae 215 to contact the opening surface 235 of the container. The setae may be compressed against the opening surface 235, fastening the cap 210 to the container 205. As the cap 210 is pushed onto the container 205, the cap and/or the spring mechanism 225 may be pressed against the stopper mechanism 245. For example, the spring mechanism 225 may abut the stopper mechanism 245 when the cap 210 is pressed onto the container 205, contracting the spring mechanism, thereby generating a force that engages the spring mechanism. The engaged spring mechanism 225 may exert a force that presses the inner surface 230 and, therefore, the setae 215 against the opening surface 235, promoting adhesion of the setae to the opening surface. In an embodiment, the engaged spring mechanism 225 may be configured to provide a resistive force on the cap 210. The resistive force may be parallel to the direction of the adhesion force provided by the setae 215, which is parallel to the inner surface 230. The engaged spring mechanism 225 may operate to push the cap 210 in the opening direction along the opening surface 235, reinforcing the adhesion force at the location where the setae 215 contact the opening surface.

The gecko-like container capping system 200 may comprise one or more release mechanisms to aid in removal of the cap 210 from the container 205. In an embodiment, a release mechanism may comprise one or more dimple structures 220 arranged, for example, at the upper end of the inner surface 230. In an embodiment, the closed container 205 may be opened by pushing the cap 210 further down in a closing direction (e.g., further down from the closed position) to further compress the spring structure 225 and cause the dimple structures 220 to reduce the adhesion force between the inner surface 230 and the opening surface 235. For example, when the cap 210 is pushed further down from the closed position, the dimple structures 220 may slide down against the setae 215, peeling the setae from the opening surface 235, thereby breaking the adhesion force between the cap and the container 205. In another example, when the cap 210 is pushed further down from the closed position, the dimple structures 220 may deflect the opening surface 235 away from the inner surface 230 such that the setae 215 no longer contact the opening surface or do not have sufficient contact as to generate the adhesion force necessary to prevent removal or relatively easy removal of the cap.

In an embodiment, when the cap 210 is pushed further down from the closed position and adhesion between the cap and the container 205 has been sufficiently reduced, the spring mechanism 225 may expand and operate to push the cap upward to promote removal of the cap from the container (as opposed to the inward force generated when the container and cap are in the closed position).

The setae 215 may differentially adhere to a surface based on the direction that the setae are being pressed against or removed from the surface. For example, the setae 215 may adhere to the container 205 when being pressed against the opening surface 235 in a direction parallel to the surface containing the setae (e.g., the inner surface 230), such as when the cap 210 is being placed on the container. The adhesion force of the setae 215 may be reduced or substantially non-existent when the setae contact or move about the opening surface 235 in a direction other than being pressed against the opening surface in a direction parallel to the surface containing the setae. For example, twisting the cap 210 about the opening 240 may reduce or eliminate the adhesion force generated by the setae 215 and facilitate removal of the cap from the container 205.

Figure 3:
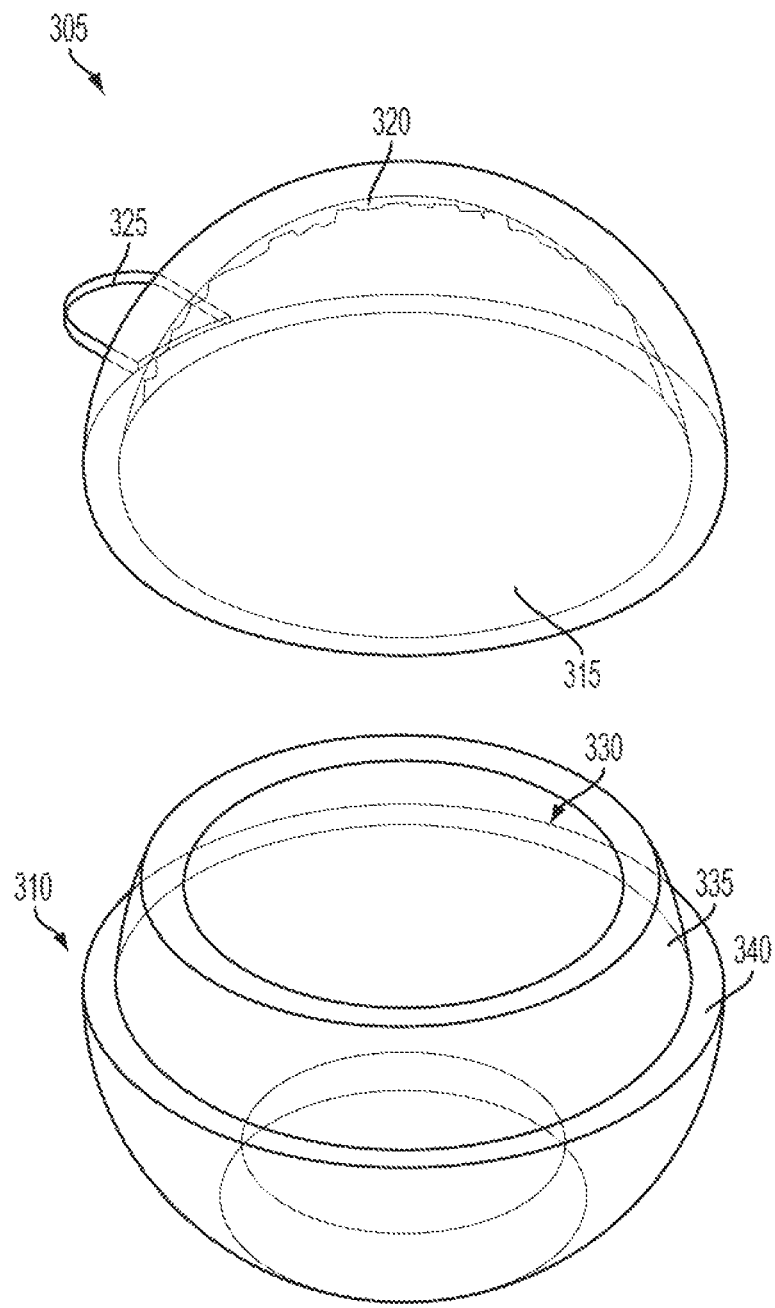
FIG. 3 depicts an illustrative gecko-like container capping system for a bowl-shaped container according to some embodiments.

FIG. 3 depicts an illustrative gecko-like container capping system for a bowl-shaped container according to some embodiments. As depicted in FIG. 3, the bowl-shaped container 305 may comprise an opening 330 formed by an opening surface 335 and a stopper mechanism 340 configured to receive a lower portion of the cap 310. The cap 310 may comprise an inner surface 315 having setae 320 arranged thereon and a release mechanism 325 configured to facilitate the release of the cap 310 from the bowl-shaped container 305.

The cap 310 may be pushed onto the container 305 such that the inner surface 315 of the cap 310 comes into contact with the opening surface 335 of the container 305 and the lower portion of the cap 310 comes into contact with the stopper mechanism 340. In this position, the setae 320 may be pressed against the opening surface 335, generating an adhesion force that fastens the cap 310 to the container 305.

As depicted in FIG. 3, the release mechanism 325 may generally involve a tab-like structure protruding from the lower portion of the cap 310. Pulling on the release mechanism 325 may, for example, deform the cap 310 and/or pull the cap away from the container 305, releasing the setae 320 from the opening surface 335. In this manner, the cap 310 may be efficiently removed from the container 305 notwithstanding the strong adhesive properties provided by the setae 320.

Figure 4:
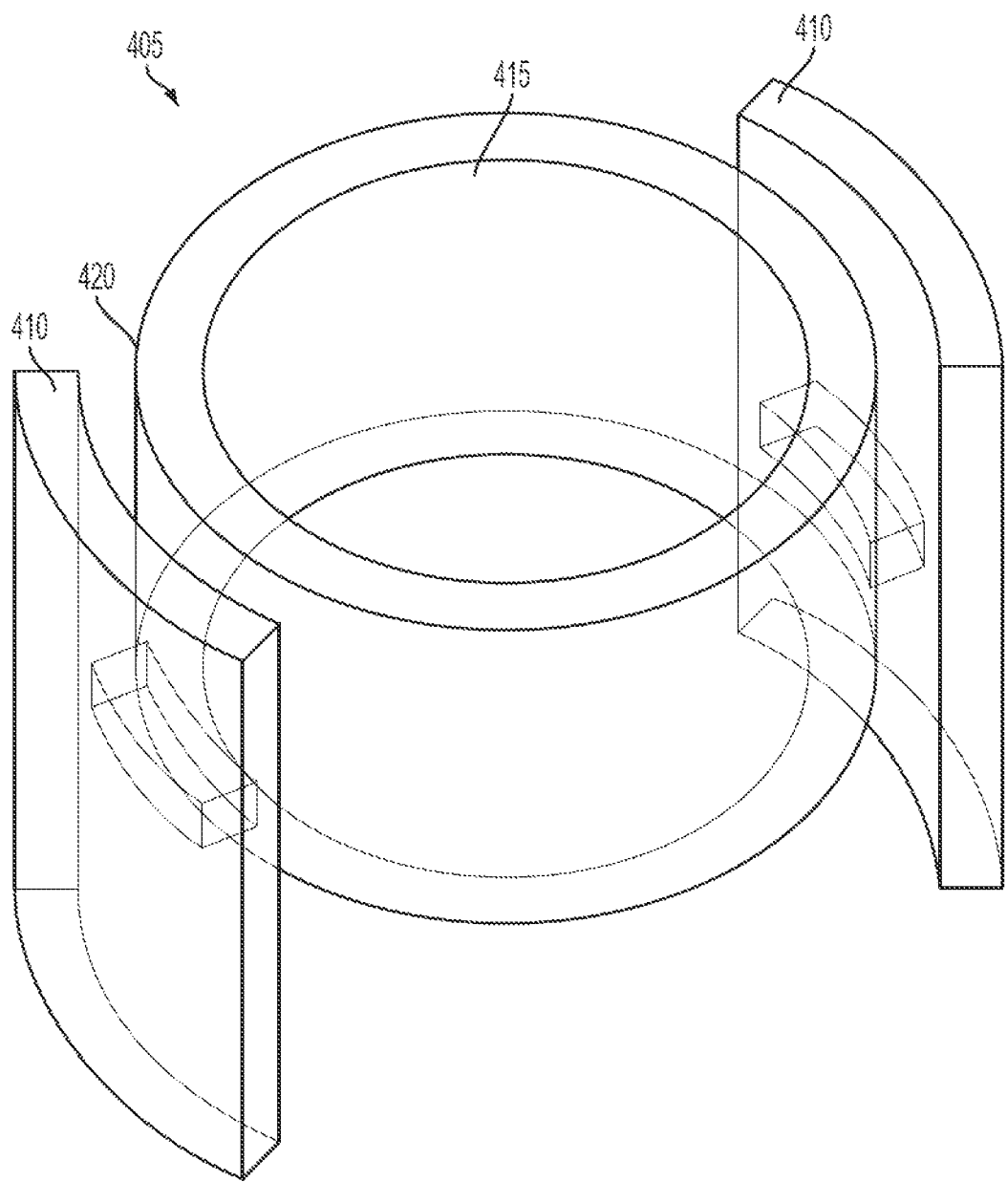
FIG. 4 depicts an illustrative gecko-like cap according to some embodiments.

FIG. 4 depicts an illustrative gecko-like cap according to some embodiments. The cap 405 may comprise an inner surface 415 having setae (not shown) arranged thereon. One or more spring mechanisms 410 may be associated with the cap 405. In an embodiment, the spring mechanisms 410 may be compressed and engaged when the cap 405 is positioned on a container (not shown), providing a force that presses against the cap body 420. The force against the cap body 420 may be transferred to the inner surface 415 of the cap 405, thereby adding to one or more existing forces or introducing one or more forces that press the setae against the container. In another embodiment, the spring mechanisms 410 may de-compress when the cap 405 is removed from the container, providing a force in a direction away from the container that facilitates removal of the cap 405 from the container.

Figure 5:
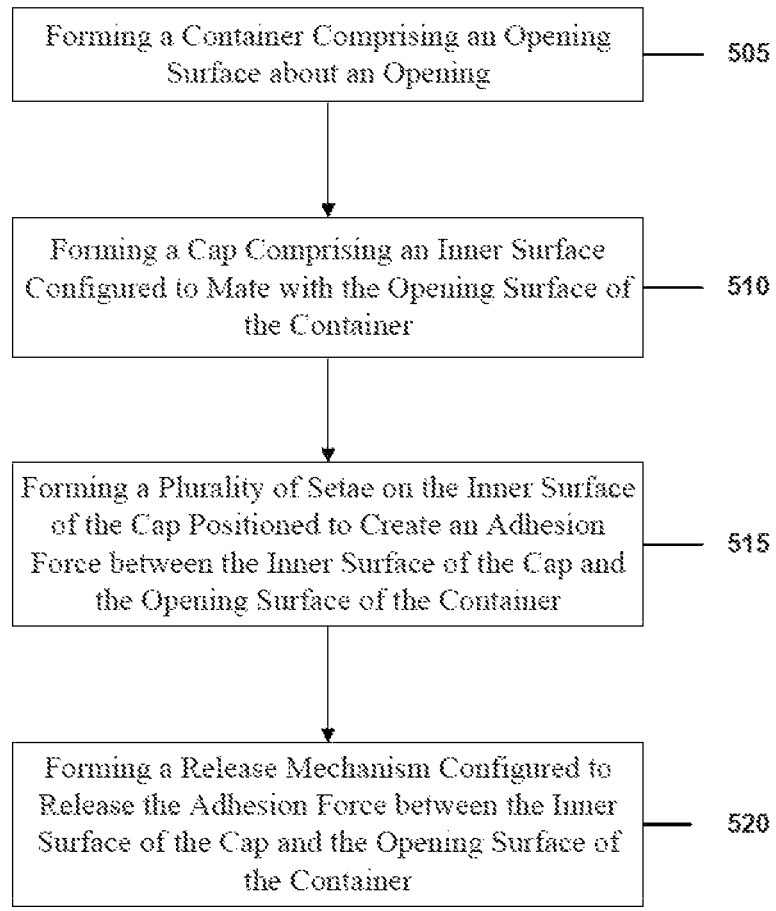
FIG. 5 depicts a flow diagram for an illustrative method of manufacturing a cap to cover an opening in a container according to some embodiments.

FIG. 5 depicts a flow diagram for an illustrative method of manufacturing a cap to cover an opening of a container according to some embodiments. A container may be formed 505 comprising an opening surface about an opening. In an embodiment, the opening surface may form a neck of the container, such as the neck of a conventional beverage container. The container may be formed 505 of various suitable materials, including, without limitation, high density polyethylene (HDPE), low density polyethylene (LDPE), polyethylene terephthalate (PET), polyvinyl chloride (PVC), polypropylene (PP), polystyrene (PS), post-consumer resin (PRC), K-resin, and combinations thereof. In an embodiment, the container may be formed 505 using an injection molding process.

A cap may be formed 510 comprising an inner surface configured to mate with the opening surface of the container. The cap may be formed 510 to correspond with the opening of the container, for example, to conform to the size and shape of the opening and/or the opening surface. In an embodiment, the cap may be formed 510 such that the inner surface contacts the opening surface of the container. Processes similar to those used to form 505 the container, such as injection molding processes, may be used to form the cap. The cap may comprise suitable materials according to some embodiments described herein, including materials used to form 505 the container as described herein. In an embodiment, the container and the cap may be formed 505, 510 of the same or substantially the same material or materials.

A plurality of setae may be formed 515 on the inner surface of the cap, positioned to create an adhesion force between the inner surface of the cap and the opening surface of the container when the cap is positioned on the container. The setae may be formed 515 according to various suitable processes, including processes presently known or developed in the future, capable of generating setae configured to perform according to some embodiments described herein. Non-limiting examples of processes for forming 515 the setae include plastic electrospinning, nanoimprinting, and lithography. The setae 515 may be formed on the inner surface of the cap and may provide an adhesion force between the inner surface of the cap and the opening surface of the container when the inner surface of the cap is pressed against the opening surface of the container.

A release mechanism may be formed 520 that is configured to release the adhesion force generated by the setae between the inner surface of the cap and the opening surface of the container. In an embodiment, the release mechanism may comprise one or more dimple structures, for example, located at a top position inside the cap. The release mechanism may be formed 520 to operate according to various methods. For example, by forcing a structure between the setae and the container to peel the setae away from the container, by deflecting an opening surface of the container away from the cap, and combinations thereof, effectively reducing or releasing the adhesion force between the setae and the opening surface of the container. The release of the adhesion force allows for the cap to be removed or more easily removed from the container.

Figure 6:
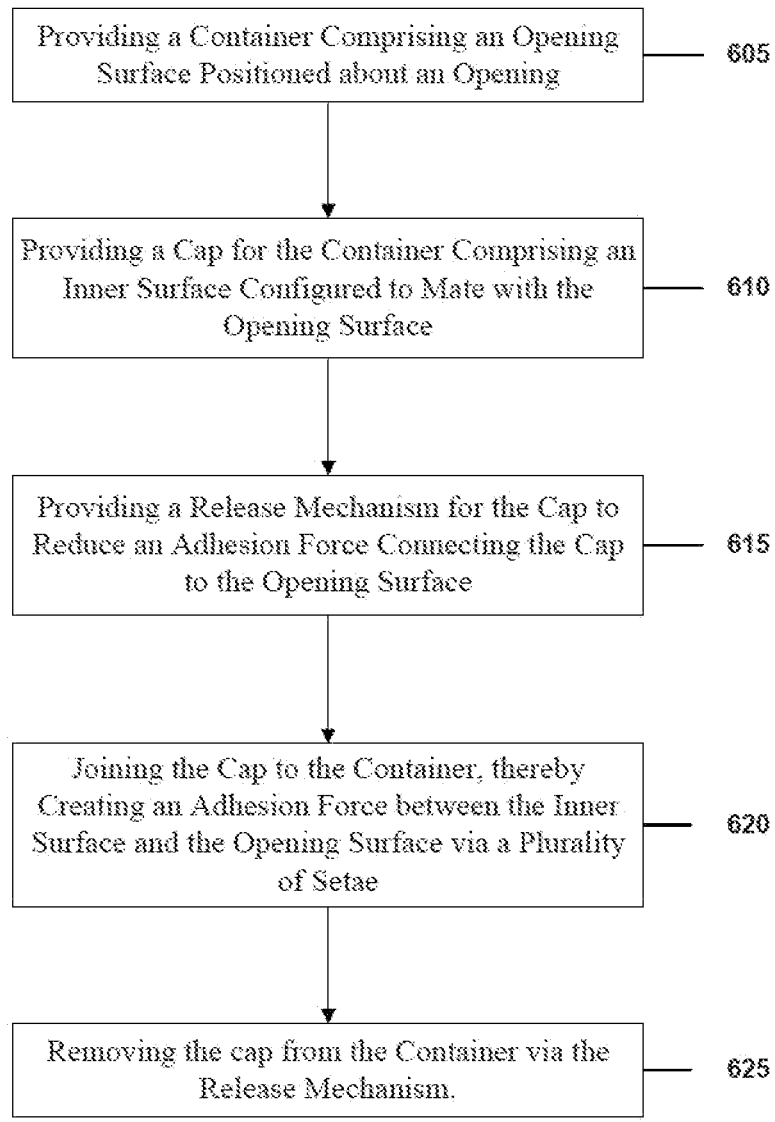
FIG. 6 depicts a flow diagram for an illustrative method of sealing a container according to some embodiments.

FIG. 6 depicts a flow diagram for an illustrative method of sealing a container according to some embodiments. A container may be provided 605 comprising an opening surface positioned about the opening. For example, a food container may be provided 605 comprising an opening for receiving food formed by an opening surface arranged about the opening. A cap for the container may be provided 610 comprising an inner surface configured to mate with the opening surface. In an embodiment, the inner surface of the cap and the opening surface of the container may be formed of a complementary or substantially complementary shape and size, such that the inner surface may come in contact or close contact with the opening surface when the cap is placed on the container opening. A plurality of setae may be arranged on the inner surface of the cap. The plurality of setae may be configured to adhere to the opening surface of the container, for example, when pressed against the opening surface of the container.

A release mechanism may be provided 615 for the cap to reduce and/or release an adhesion force connecting the cap to the container. In an embodiment, the release mechanism may be configured to deflect the inner surface away from the opening surface, thereby reducing the adhesion forces holding the cap to the container.

The cap may be joined 620 to the container such that the inner surface of the cap is positioned adjacent to the opening surface of the container, thereby creating an adhesion force between the inner surface and the opening surface via the plurality of setae. In an embodiment, joining the cap to the container may cause the setae to press against the opening surface of the container. Pressing the setae against the container may result in an adhesion force capable of fastening the cap to the opening surface of the container.

The cap may be removed 625 from the container using one or more release mechanisms. The release mechanisms may be configured to facilitate the removal or reduction of the adhesion force generated by the setae. In an embodiment, a release mechanism may comprise one or more dimple structures arranged within the cap. The dimple structures may be configured to reduce the adhesion forces responsive to the cap being pushed down further from a closed position. For example, pushing the cap down further may cause the dimple structures to deflect the opening surface of the container away from the setae, peeling the setae away from the opening surface, sufficiently reducing the adhesion force such that the cap may be removed from the container.

EXAMPLES

Example 1

Gecko-Like Water Bottle Container System

A container will be manufactured from HDPE by an injection molding process in the form of a conventional water bottle. The water bottle will have an opening formed by an opening surface in the shape of a bottle neck. A stopper configured to receive the lower portion of a cap will be formed on the neck. The cap will be manufactured from HDPE by an injection molding process. Setae will be formed on an inner surface of the cap following completion of the injection molding process using a nanoimprinting process. During the nanoimprinting process, a stamping mold configured to imprint setae in an HDPE substrate will be heated above the deformation temperature of HDPE and rolled against the inner surface of the cap, forming a collection of setae within the cap. The cap will have a release mechanism in the form of two dimple structures located above the setae on opposite sides of the inner surface of the cap. A spring mechanism will be located below the setae at a lower portion of the cap.

Pushing the cap down onto the neck of the water bottle will cause the setae to contact the neck and the lower portion of the cap to contact the stopper. When the lower portion of the cap contacts the stopper, the force of pushing the cap down will be directed toward contracting the spring mechanism. When the spring mechanism is contracted such that it is engaged, it will impart a force on the body of the cap generating pressure forcing the setae against the neck of the water bottle. The setae will generate an adhesion force fastening the cap to the water bottle and the water bottle and cap will be in a closed position.

When the cap is in the closed position, pushing the cap further down will engage the release mechanism. The dimple structures of the release mechanism will press against an outer surface of the neck of the water bottle and deflect the neck away from the setae. The setae will peel away from the neck and the adhesion force between the setae and the neck will be reduced and the cap will be removed from the water bottle. When the cap is being pulled upward, away from the container, the spring mechanism will expand and impart a force in an opening direction, away from the container, that further facilitates the removal of the cap from the water bottle.

Example 2

Gecko-Like Food Container System

When manufactured, a food container will have a substantially square shape and will be formed from PP. The food container will include an opening and an opening surface about the opening. A stopper in the form of a ridge will be located at the bottom of the opening surface. A gecko-like cover for the container will be formed out of PET and will generally conform to the size and shape of the container opening surface, being slightly larger such that it will fit around the opening surface. Setae will be formed on and around an inner surface of the gecko-like cover and will be configured to contact the opening surface. The setae will be formed as nano-fiber mats created through an electrospinning process. The gecko-like cover will include a release mechanism in the form of an elongated tab protruding out from one corner of the gecko-like cover.

Pressing the gecko-like cover down against the opening surface of the container until it comes into contact with the stopper will cause the setae to contact the opening surface and generate an adhesion force sufficient to form a substantially water tight seal. Pulling out and up on the release mechanism will deform the gecko-like cover and reduce the adhesion force such that the gecko-like cover will be removed from the container.

Example 3

Container Cap Having a Gecko-Like Inner Surface

An approximately 5 µm-thick polyimide film will be baked at about 250° C. on top of a silicon wafer. An array of submicrometer aluminum disks will be prepared using electron-beam lithography, thermal evaporation of an aluminum film and lift-off. The resulting aluminum pattern will be transferred to the polyimide film by dry etching in oxygen. The oxygen plasma etching will provide a large difference between etching rates of aluminium oxide and polyimide, such that several micrometers of polyimide will be removed before the aluminium disk disappears.

A negative direct current (DC) bias will be applied to the substrate to achieve large aspect ratios, making the pillars sufficiently tall. The polyimide will be peeled from the silicon wafer and transferred onto the inner surface of a container cap by using an adhesive to provide a container cap having a Gecko-like inner surface.

Example 4

Bottle Cap for Sealing Various Materials in a Container

A container will be manufactured from PET by an injection molding process in the form of a water bottle. The water bottle will have an opening formed by an opening surface in the shape of a bottle spout. A corresponding bottle cap for the water bottle will be manufactured from PP by an injection molding process.

A smooth inner surface of the bottle cap will be fitted with suction cup tape that includes an acrylic foam sheet with microscopic suction cups formed on both sides. The suction cup tape will be or will be similar to Regabond-S suction cup tape made commercially available by the Exel Trading Co., Ltd of Tokyo, Japan.

The bottle cap will be fastened to the bottle spout such that the suction cup tape will contact an outer surface of the bottle spout. The bottle cap and bottle spout will become affixed and form a leak-proof seal such that the bottle will contain liquid and solid substances without unwanted releases of the substances.

The bottle cap will be removed responsive to manual squeezing of the bottle cap combined with pulling upward (e.g., away from the bottle) on the bottle cap. Manual squeezing of the bottle will deflect the bottle cap away from the bottle such that contact between the suction cup tape on the inner surface of the bottle cap and the outer surface of the bottle spout will be disrupted, allowing the bottle cap to be released and easily removed.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A cap configured to cover an opening in a container, the cap comprising:
    an inner surface configured to mate with an opening surface of a container, the inner surface comprising a plurality of setae configured to oppose movement of the cap away from the container by creating an adhesion force between the inner surface and the opening surface; and
    at least one release mechanism configured to reduce the adhesion force such that the cap is removable from the container through at least one of contacting at least a portion of the plurality of setae to peel the portion of the plurality of setae away from the opening surface and contacting the opening surface to deflect the opening surface away from the inner surface.

2. The cap of claim 1, further comprising at least one spring mechanism configured to provide a resistive force between the inner surface and the opening surface in a direction that is parallel to a direction of the adhesion force.

3. The cap of claim 1, wherein each of the plurality of setae has a diameter of about 10 nm to about 100 µm.

4. The cap of claim 1, wherein each of the plurality of setae has a length of about 10 µm to about 500 µm.

5. The cap of claim 1, wherein the cap comprises a same material as the container.

6. The cap of claim 1, wherein the cap comprises at least one of high density polyethylene, low density polyethylene, polyethylene terephthalate, polyvinyl chloride, polypropylene, polystyrene, post-consumer resin, K-resin, acrylonitrile butadiene styrene, polylactic acid, acryl resin, and combinations thereof.

7. The cap of claim 1, further comprising at least one tab release mechanism configured to reduce the adhesion force via deflecting the inner surface away from the opening surface.

8. The cap of claim 1, wherein the at least one release mechanism is configured to reduce the adhesion force such that the cap is removable from the container through contacting at least a portion of the plurality of setae to peel the portion of the plurality of setae away from the inner surface.

9. The cap of claim 1, wherein the at least one release mechanism is configured to reduce the adhesion force such that the cap is removable from the container through contacting the opening surface to deflect the opening surface away from the inner surface.

10. A container configured to receive a cap for closing an opening of the container, the container comprising:
    an opening surface configured to mate with an inner surface of the cap, the opening surface comprising a plurality of setae configured to oppose movement of the cap away from the container by creating an adhesion force between the inner surface and the opening surface;

at least one release mechanism configured to reduce the adhesion force such that the cap is removable from the container; and a stopper mechanism configured to receive a spring mechanism of the cap, the spring mechanism being configured to provide a resistive force between the inner surface and the opening surface in a direction that is parallel to a direction of the adhesion force.

11. The container of claim 10, wherein the container comprises a same material as the cap.

12. The container of claim 10, wherein the container comprises high density polyethylene, low density polyethylene, polyethylene terephthalate, polyvinyl chloride, polypropylene, polystyrene, post-consumer resin, K-resin, acrylonitrile butadiene styrene, polylactic acid, acryl resin, and combinations thereof.

13. The container of claim 10, wherein the inner surface comprises at least a portion of the plurality of setae.

* * * * *